United States Patent [19]

Horovitz

[11] Patent Number: 4,914,836
[45] Date of Patent: Apr. 10, 1990

[54] CUSHIONING AND IMPACT ABSORPTIVE STRUCTURE

[76] Inventor: Zvi Horovitz, 21 Marie Dr., Andover, Mass. 01810

[21] Appl. No.: 350,304

[22] Filed: May 11, 1989

[51] Int. Cl.$^4$ .................. A43B 13/18; A43B 13/20; A43B 13/40
[52] U.S. Cl. .................................. 36/28; 36/29; 36/44; 139/384 R; 297/DIG. 3; 428/178
[58] Field of Search .................. 36/28, 29, 44, 43; 139/384 R, 390, 397, 410, 423; 66/196; 428/178, 101; 297/DIG. 3

[56] References Cited

U.S. PATENT DOCUMENTS

| | | | |
|---|---|---|---|
| Re. 32,412 | 5/1987 | Plagenheff | 36/28 X |
| 1,673,636 | 6/1928 | Perry | 297/DIG. 3 |
| 2,356,456 | 8/1944 | Garner | 139/397 X |
| 2,409,087 | 10/1946 | Weinberger | 139/390 |
| 2,627,077 | 2/1953 | Forsyth | 297/DIG. 3 |
| 2,672,183 | 3/1954 | Forsyth | 297/DIG. 3 |
| 3,009,232 | 11/1961 | Martin | 139/384 R |
| 3,234,972 | 2/1966 | Koppelman et al | 139/384 R |
| 4,108,492 | 8/1978 | Kirby | 297/DIG. 3 |
| 4,183,156 | 1/1980 | Rudy | 36/29 X |
| 4,356,642 | 11/1982 | Herman | 36/44 |
| 4,813,161 | 3/1989 | Lesley | 36/44 |
| 4,852,274 | 8/1989 | Wilson | 36/29 |

FOREIGN PATENT DOCUMENTS

| | | | |
|---|---|---|---|
| 2855268 | 7/1980 | Fed. Rep. of Germany | 36/29 |
| 53-94655 | 8/1978 | Japan | 139/423 |
| 7713557 | 8/1979 | Sweden | 36/43 |
| 385060 | 12/1932 | United Kingdom | 36/29 |

*Primary Examiner*—James Kee Chi
*Attorney, Agent, or Firm*—Edward A. Gordon

[57] ABSTRACT

The present invention pertains to a structure resistant to the transmission of forces of impact which is useful in the fabrication of articles subjected to impact forces by the user of the articles. The structure includes a double plush-like open mesh structure having first and second layers of interlaced stretch-resistant flexible strand material positioned adjacent each other, and defining an intermediate space therebetween. A plurality of elongated partitions are disposed between the first and second layers and divide the intermediate space into a plurality of elongated generally parallel channels. The partitions each comprise a plurality of pile stretch-resistant strand material connecting with the first and second layers in a plane generally perpendicular to the first and second layers. Resiliently-compressible single cell fluid-impermeable tubular members are disposed within at least a majority of chambers and adaptable to be inflated under fluid pressure to within the confining limits of the chamber walls to provide a cushioning and impact absorption structure.

10 Claims, 2 Drawing Sheets

CUSHIONING AND IMPACT ABSORPTIVE STRUCTURE

BACKGROUND OF THE INVENTION

1. Field Of The Invention

The present invention relates to shock absorbing devices and more particularly to a new and improved structure resistant to the transmission of forces of impact and adapted to form an integral part of articles subject to impact forces by the user of the articles.

While the structure of the present invention will be described more particularly with respect to fabricating footwear of the type having shoe upper affixed to a sole including inserts for such footwear, the present invention is also useful in forming other articles requiring cushioning and impact absorptive features.

2. Description Of Prior Art

U.S. Pat. Nos. 4,805,319 and 4,656,670 relate to the encapsulation of a cellular insert, formed of various woven cellular components, or fabricated to a grooved design formed of a series of linearly woven strands, each of which presents various voids or cavities within their formed structure, and then foamed in place within a polymer formed sock liner or insole for use within footwear.

U.S. Pat. No. 4,297,796 relates to a shock-absorbing athletic shoe having a foot-cushioning inner sole member to one face in which, and to at least a portion of the rim in which, is bonded an open-mesh web. The web includes elongated, interwoven stretch-resistant strands which are disposed at oblique angles relative to the shoe's long axis. These strands act as force-transmitters with respect to the sole member, and cause a localized foot-produced deformation in the member to be "distributed" to other regions in the member.

U.S. Pat. No. 4,756,096 relates to a custom molded insole for supporting the human foot in a ski boot or other footwear. The insole is a one-piece, thin, contoured blank of semi-rigid, bendable, resilient material molded to include the complete detail of the full plantar surface of a foot. The insole provides a four-point contact with a supporting surface or ski boot at the heel, great toe, and at least two spaced metatarsal heads to provide natural balance and proper dynamic positioning of the foot and immediate energy transfer between the foot and various footwear such as a boot/ski when skiing.

While these prior art patents provide improvements in the areas intended, there still exists a great need for a cushioning and impact absorptive structure which is resistant to the transmission of impact forces and useful in fabricating articles such as footwear including inserts for footwear which are subject to such forces of impact while being relatively simple in construction form.

Accordingly, a principal desirable object of the present invention is to provide a new and improved cushioning and impact absorptive structure having the foregoing characteristics.

Another desirable object of the present invention is to provide a structure for fabrication of the insole and which is predetermined and designed for cushioning and absorbing impact forces through the sole of the shoe to the foot of the wearer thereby reducing foot fatigue as well as actually reducing the energy necessary to run and actively partake in an athletic event.

Another desirable object of the present invention is to provide a cushioning and impact absorptive structure which is readily adaptable to form an integral part of articles which are subject to forces of impact.

A still further desirable object of the present invention is to achieve the above desirable objects with an essentially simple structure, lending itself to inexpensive mass-production.

These and other desirable objects of the invention will in part appear hereinafter and will in part become apparent after consideration of the specification with reference to the accompanying drawings and the claims.

SUMMARY OF THE INVENTION

In accordance with the present invention a structure means resistant to the transmission of forces of impact is provided which is useful in the fabrication of articles subjected to impact forces by the user of the articles and which can be formed to selected configurations. The structure of the present invention generally envisions a double plush-like open mesh structure having first and second, or upper and lower, layers of interlaced stretch-resistant flexible strand material positioned adjacent each other, and defining an intermediate space between the first layer and second layers. A plurality of elongated partitions are disposed between the first and second layers and divide the intermediate space into a plurality of elongated generally parallel channels. The partitions each comprise a plurality of pile stretch-resistant strand material connecting with the first and second layers in a plane generally perpendicular to the first and second layers. The channels formed by the linking of the first and second layers by the pile partition strands have a generally rectilinear configuration. Resiliently-compressible single cell fluid-impermeable tubular members are disposed within at least a majority of chambers and adaptable to be inflated under fluid pressure to within the confining limits of the chamber walls, which are each defined by adjacent partitions and the portions of the first and second layers within the adjacent partitions, to provide cushioning and impact absorption to impact forces.

The invention also contemplates an embodiment wherein the first and second layers of the interlaced stretch-resistant strand material are covered with a metalized layer of fluid impermeable material such as a layer of polymer material having a metal coating deposited upon the outer surface. The outer metalized layer provides additional resistance to diffusion of fluid gases out of the structure. The invention also contemplates another embodiment which includes a plurality of juxtaposed structure means. In such an embodiment, the overall fluid pressure of each structure can be varied depending upon the type of article the structures are employed with.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DESCRIPTION OF PREFERRED EMBODIMENT(S)

Figure 1:
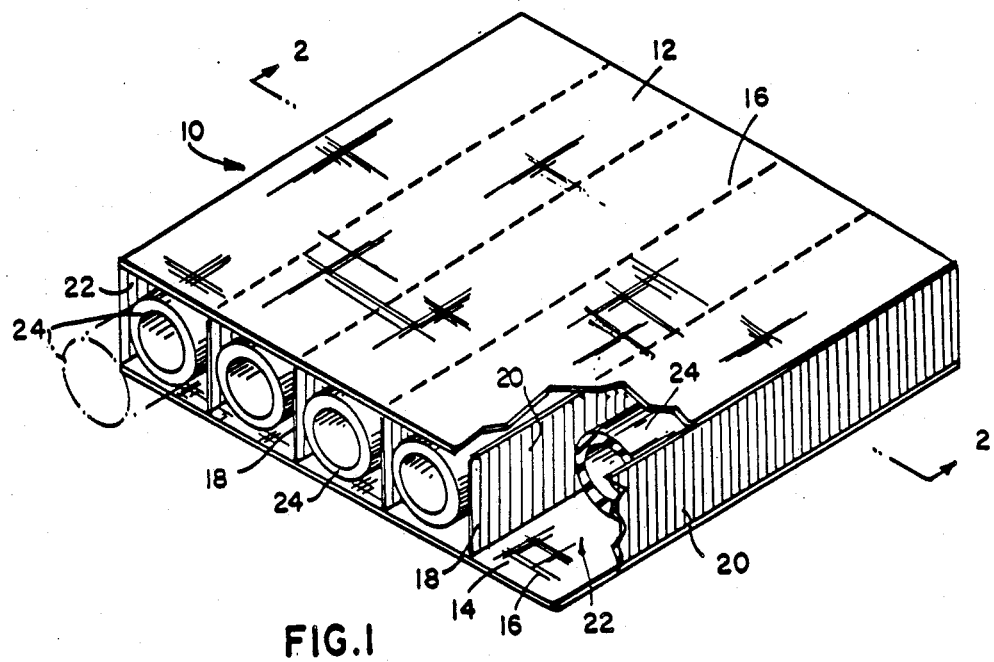
FIG. 1 is a fragmentary perspective view illustrating a structure embodying the principals of the present invention.
Figure 2:
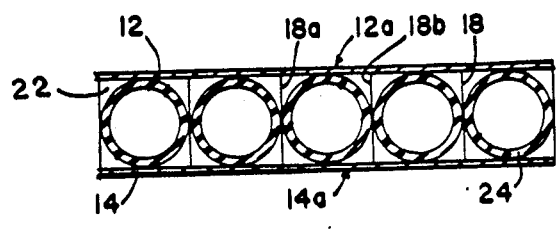
FIG. 2 is a cross-sectional view taken along the line 2—2 of FIG. 1.

Referring now to the drawings and particularly to FIGS. 1 and 2, there is shown an embodiment of the basic structure means providing resistance to the transmission of forces of impact in accordance with the present invention. As illustrated, the structure, indicated generally by the numeral 10, comprises a double plush open mesh construction having an upper plush layer 12 and a lower plush layer 14, each formed of interlaced stretch-resistant flexible strand material 16. A plurality of elongated partitions or piles 18 formed of stretch-resistant strand material 20 connecting with the first and second layers in a plane generally perpendicular to the planes of the first and second layers 12 and 14 respectively are provided. Adjacent partitions (for example 18a and 18b of FIG. 2) together with the portions 12a of the upper layer 12 and 14a of the lower layer 14 between the partitions 18a and 18b each have a generally rectilinear configuration and form elongated channels or pipes 22 having a generally square or rectangular shape.

Suitable materials for forming the upper layer 12, the lower layer 14 and partitions or perpendicular piles are heat formable stretch-resistant or fully drawn materials such as polyesters, nylon, polypropylene, polyethylene and the like. Additionally, conventional processes (and equipment therefor) such as weaving and knitting can be employed to form the intimate interlaced unified structure of the present invention.

Figure 3:
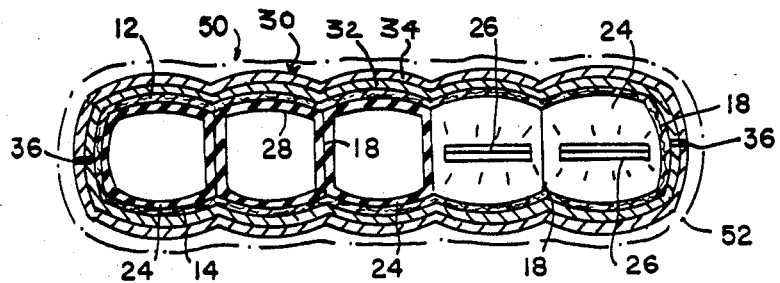
FIG. 3 is a cross-sectional view of a structure similar to FIG. 1 and further illustrating the tubular members in an inflated condition under fluid pressure; the sealed ends of the tubular members; and also including an outer metalized layer.

There are disposed or inserted into the channels 22, flexible, expandable, fluid impermeable tubular members 24. The tubular members can, for example, be formed of a heat sealable elastomer which is impermeable to gaseous fluids. In a preferred embodiment the thickness of the tubular wall is selected in relation to the material forming the tubular member so that the tubular member is expandable to the confining limits of the channels 22 (as best seen in FIG. 3) to provide improved cushioning and impact absorption to impact forces.

While it is not essential that tubular members be provided for all channels, which in part may be determined by the use of the structure and the level of action to be encountered, it is preferable that at least a majority of the chambers be filled with the tubular members.

The gaseous fluids which can be employed to fill the pressurized tubular members 24 of the structure 10 should preferably be a gas which will not diffuse appreciably through the walls of the tubular member material for an extended period of time (e.g., several years).

The two most desirable gases have been found to be hexafluorethane (e.g., Freon F-116) and sulfur hexafluoride.

Other gases which have been found to be acceptable, although not as good as hexafluorethane and sulfur hexafluoride, are as follows: perfluoropropane, perfluorobutane, perfluoropentane, perfluorohexane, perfluoroheptane, perfluorocyclobutane, octafluorocyclobutane, hexafluoropropylene, tetrafluoromethane (e.g., Freon F-14), monochloropentafluoroethane (e.g., Freon F-115), and other Freon gases known as Freon 114, Freon 113, Freon 13 B-1, and Freon 13. It is to be understood that while the foregoing gases are preferred, other gases such as air, oxygen, nitrogen and mixtures of such gases can be employed.

Referring more particularly to FIG. 3, the structure indicated generally by the numeral 50 includes the basic structure 10 of FIG. 1 and further shows the tubular members 24 in the sealed and inflated pressurized state. Each end of the tubular members are sealed as shown at 26 to form a single cell fluid-impermeable member 24. Additionally, as mentioned herein, the elasticity of the tubular members 24 is selected including the thickness of the tubular wall 28 so that when the tubular member is sufficiently inflated under gaseous pressure, it conforms generally to the shape of the channel walls to provide improved cushioning and impact absorption. This embodiment also illustrates the use of a metalized layer 30, which is impermeable to fluid gases, disposed about the outer surface of the structure 50. A suitable metalized layer is aluminum coated MYLAR. The metalized layer comprises an inner layer of polymer material 32 having a metal coating 34 on the outer surface. The metalized layer 30 can be laminated to the upper and lower layers 12 and 14 by a suitable conventional adhesive (not shown) and sealed at the ends 36.

Figure 4:
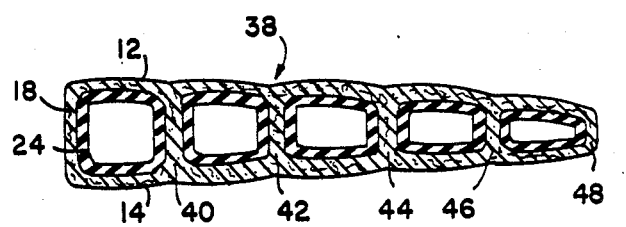
FIG. 4 is a cross-sectional view of an alternate embodiment of the structure embodying the principal of the present invention and having a tapered configuration.

Referring now to FIG. 4, there is illustrated a modified embodiment of the structure embodying the principals of the present invention. As shown, the structure identified generally by the numeral 38 includes a first layer 12, a second layer 14 and tubular members 24 as described with respect to the structure 10 of FIGS. 1-3. In this embodiment, however, the partition or piles 18 and 40-48 decrease in height to provide an overall tapered configuration to the structure 38. Such tapered configurations are useful, for example, when the structure of the present invention is used in the fabrication of seat cushions for automobiles, for example. For such use, the structures can be provided with a suitable outer cover (not shown). It is to be understood that other configurations can be provided by varying the partition heights.

A similar use can be appreciated by referring again to FIG. 3. The structure, illustrated generally by the numeral 50, can be constructed in various sizes for use as mats or mattresses. Also a cover 52 represented by the dotted line can be employed. Such covers can be formed of conventional materials such as cloth fabrics, plastics and the like.

Figures 5, 6:
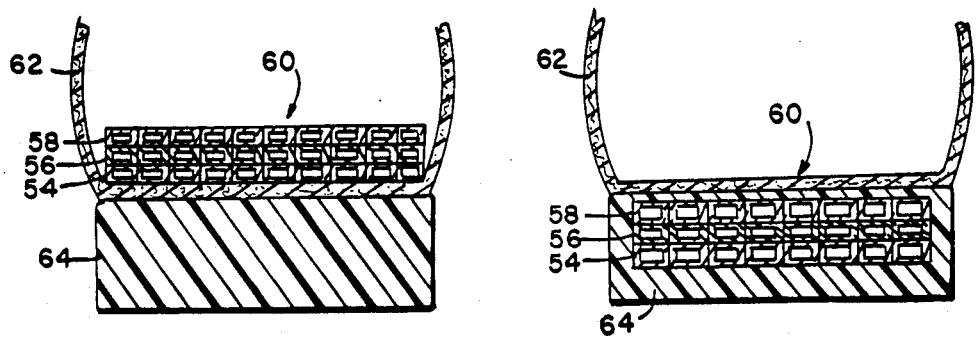
FIG. 5 is a cross-sectional view through a portion of a shoe illustrating the application of a multi-layered embodiment of the present invention as an insert or insole located within the shoe and in a no-load condition.
FIG. 6 is a cross-sectional view through a portion of a shoe illustrating the application of the multi-layered embodiment of the present invention located within or surrounded by the outer sole of the shoe and in a no-load condition.

Referring now to FIGS. 5 and 6, the application of the structure of the present invention as an integral part of footwear is shown. In both FIGS. 5 and 6, the structure of the type shown and described with respect to FIG. 1 is employed. However, a multi-layered structure indicated generally by the numeral 60, is employed by placing three structures 54, 56 and 58 vertically on top of each other. In FIG. 5 the multi-layer structure 60 is placed inside the shoe upper 62 which is secured to the outer sole portion 64. In this manner the structure 60 serves as an insert or insole. In FIG. 6 the structure 60 is positioned within or surrounded by the outer sole 64.

It has been found that many activities can be accommodated when the tubular members are inflated to a pressure of between about 2 psi and about 120 psi. Of course, the use of the article of footwear in which the improved sole structure construction of the present invention is incorporated will determine the optimum pressure to which the sole structure should be inflated. For example, if the sole structure is to be employed in a pair of track shoes for a runner, the sole structure should be inflated to a higher pressure than if the sole structure construction is to be employed in a pair of ordinary street shoes. For low level athletic endeavors (e.g., walking), the pressure to which the tubular members of the sole structure should be inflated is between about 18 and 40 psi. For high level athletic endeavors, the inflation pressure should be between about 30 and 120 psi. For ordinary street shoes the inflation pressure should be between about 12 and 30 psi.

Referring again to FIGS. 5 and 6, one advantage of the present invention is that the multi-layered structure 60 can be provided with various pressure range values for each structure. For example, the bottom structure 54 can be in a range of 80-120 psi, the middle structure 56 in a mid-range of 40-80 psi and the upper structure in the low range of 20-40 psi. In this manner the shoe or footwear employing the structure of the present invention provides for an enhanced range of resistance to the transmission of impact forces as may be encountered by high and low level athletic endeavors. While this embodiment of the invention has been described with respect to multi-layered structures of the present invention, it is to be understood that one or more structures can be employed depending on the particular article for which the structure(s) is used.

When the structure of the present invention is adapted as an integral part of seat cushions for motor vehicles, aircraft and the like, the invention contemplates the use of inflammable, or flame retardant gases such as HALON gas to pressurize the tubular members.

The structure of the present invention is suitable for mass production since the double plush structure can be formed by conventional weaving techniques into a commercial width including selected configurations. The tubular member can then be inserted and the structure cut to the designed shape while simultaneously heat sealing and pressurizing the tubular members.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A structure means resistant to the transmission of forces of impact for use with articles subjected to impact forces by the user of the articles, said structure means comprising:
    a first layer of interlaced flexible stretch-resistant strand material;
    a second layer of interlaced stretch-resistant flexible strand material positioned adjacent said first layer and defining an intermediate space between said first layer and said second layer;
    a plurality of elongated partitions disposed between said first and second layers and dividing said intermediate space into a plurality of elongated generally parallel channels;
    said partitions each comprising a plurality of stretch-resistant strand material connecting with said first and second layers in a plane generally perpendicular to said first and second layers;
    said channels having a generally rectilinear configuration; and
    a resiliently-compressible single cell fluid-impermeable tubular member disposed within at least a majority of said chambers and adaptable to be inflated under fluid pressure to within the confining limits of the chambers to provide cushioning and impact absorption to impact forces.

2. The structure means according to claim 1 wherein the first and second layers of interlaced flexible stretch-resistant strand material comprises a woven fabric.

3. The structure means according to claim 1 wherein the first and second layers of interlaced flexible stretch-resistant strand material comprises a knitted fabric.

4. The invention according to claim 1 wherein said structure means forms at least a portion of a footwear insole.

5. The invention according to claim 1 wherein said structure means forms at least a portion of a footwear insert.

6. An article of manufacture forming an assemblage of structure means providing variable resistance to the transmission of forces of impact for use with articles subjected to impact forces by the user of the articles comprising a plurality of juxtaposed structure means, each structure means comprising:
    a first layer of interlaced flexible stretch-resistant strand material;
    a second layer of interlaced stretch-resistant flexible strand material positioned adjacent said first layer and defining an intermediate space between said first layer and said second layer;
    a plurality of elongated partitions disposed between said first and second layers and dividing said intermediate space into a plurality of elongated generally parallel channels;
    said partitions each comprising a plurality of stretch-resistant strand material connecting with said first and second layers in a plane generally perpendicular to said first and second layers;
    said channels having a generally rectilinear configuration; and
    a resiliently-compressible single cell fluid-impermeable tubular member disposed within at least a majority of said chambers and adaptable to be inflated under fluid pressure to within the confining limits of the chambers to provide cushioning and impact absorption to impact forces.

7. The article of manufacture of claim 6 wherein the overall fluid pressure of each structure means decreases from the structure means adjacent the impact force to the structure means remotest from the impact forces.

8. The article of manufacture of claim 6 wherein the plurality of structure means are laminated to each other.

9. The article of manufacture of claim 6 wherein the plurality of structure means comprises three structure means arranged in vertical relationship forming a bottom, middle and upper structure means.

10. A structure means resistant to the transmission of forces of impact for use with articles subjected to impact forces by the user of the articles, said structure means comprising:
- a first layer of interlaced flexible stretch-resistant strand material;
- a second layer of interlaced stretch-resistant flexible strand material positioned adjacent said first layer and defining an intermediate space between said first layer and said second layer;
- a plurality of elongated partitions disposed between said first and second layers and dividing said intermediate space into a plurality of elongated generally parallel channels;
- said partitions each comprising a plurality of stretch-resistant strand material connecting with said first and second layers in a plane generally perpendicular to said first and second layers;
- said channels having a generally rectilinear configuration;
- a resiliently-compressible single cell fluid-impermeable tubular member disposed within at least a majority of said chambers and adaptable to be inflated under fluid pressure to within the confining limits of the chambers to provide cushioning and impact absorption to impact forces; and
- an outer layer covering said first and second layers of interlaced stretch-resistant strand material fabricated of a flexible continuous sheet material having a bottom surface attached to the outer surface of said first and second interlaced layers and an upper surface having a metal coating thereon;
- said outer layer being substantially completely impermeable to diffusion of fluids therethrough.

* * * * *